June 18, 1963 H. THIELE ETAL 3,094,033
CAMERA FOR PRODUCING MOTION PICTURES AND INDIVIDUAL PICTURES
Filed Jan. 16, 1961 2 Sheets-Sheet 1

United States Patent Office 3,094,033
Patented June 18, 1963

3,094,033
CAMERA FOR PRODUCING MOTION PICTURES
AND INDIVIDUAL PICTURES
Heinz Thiele and Roland Hochstein, Kiel-Wik, Germany, assignors to Zeiss Ikon Aktiengesellschaft, Stuttgart, Germany
Filed Jan. 16, 1961, Ser. No. 82,779
10 Claims. (Cl. 88—17)

The present invention relates to a camera for producing motion pictures and individual pictures and which is provided with a mechanical control device for the rotatable shutter disc and an electric motor which by means of a slip clutch drives the shutter disc and the film conveying means.

In cameras of this type the drive motor operates as long as the release button is depressed; in fact, even when individual pictures are made the motor will continue to operate even though the exposure has been completed and the shutter disc and the film feed are no longer operated. This discharges unnecessarily the battery which is used as a source of energy and exhausts the same prematurely.

A substitution of the electric motor by a spring motor is not advisable, because the spring tension used as an energy source is instantly available with its own maximum power, while an electric motor requires a certain period of starting time before the required minimum torque is developed.

In order to employ an electric motor in motion picture cameras with a mechanical control device for the shutter disc, the present invention provides a releasable locking device for the shutter disc and also control means arranged in such a relation to the camera release member that when the release key is actuated, the motor will be first connected with the voltage source and then the shutter disc and the film conveying mechanism coupled therewith are operated. This will secure that the motor always has been started and has developed a predetermined minimum torque before it is used to drive the camera.

In addition, the following should be considered. The control device for a camera producing selectively individual pictures and motion pictures is usually arranged in such a manner that the different control levers for the two types of operation cooperate with a single stop which is coupled with the shutter disc. The control levers, which act hereby as a locking means, will be moved spacially separated from each other into the path of this stop. The shutter disc will thus be arrested in different positions depending upon whether a single exposure or series of exposures are made. The position of the locking means for a single picture is usually in front of the position of the motion picture camera locking means. When a change from a single exposure to a series of exposures is made, the shutter disc will not be in the starting position necessary for making motion pictures. In motion picture cameras with spring drive the difference in the respective positions of the shutter disc stop is eliminated in this that after the lock for single picture making is eliminated, due to the constantly acting tension of the spring, the shutter disc is moved to the stop of the control lever for the motion picture. In case the camera is provided with an electric drive, the motor is disconnected after each individual exposure and also after the making of a motion picture, so that when changing from individual pictures to motion pictures a difference in the position of the shutter disc stop will have to be tolerated.

In order to have the shutter disc arranged always in a single predetermined starting position, regardless of the type of exposure to be made, the present invention provides two switches arranged in series in the supply wires of the motor. One of these switches serves as an operating contact for switching the electric installation on and off, while the other switch being designed as a rest contact will disconnect the motor for a short period of time after a single picture exposure.

Other objects of the invention for conserving the energy source, particularly when the camera is used for making single exposures, for a reliable operation of the camera when making single exposures and motion picture exposures, and the arrangement of the two switches in a release and locking linkage of the mechanical control device, will be described in detail in the following description.

One embodiment of the present invention is schematically illustrated in the accompanying drawings, in which.

Figure 1:
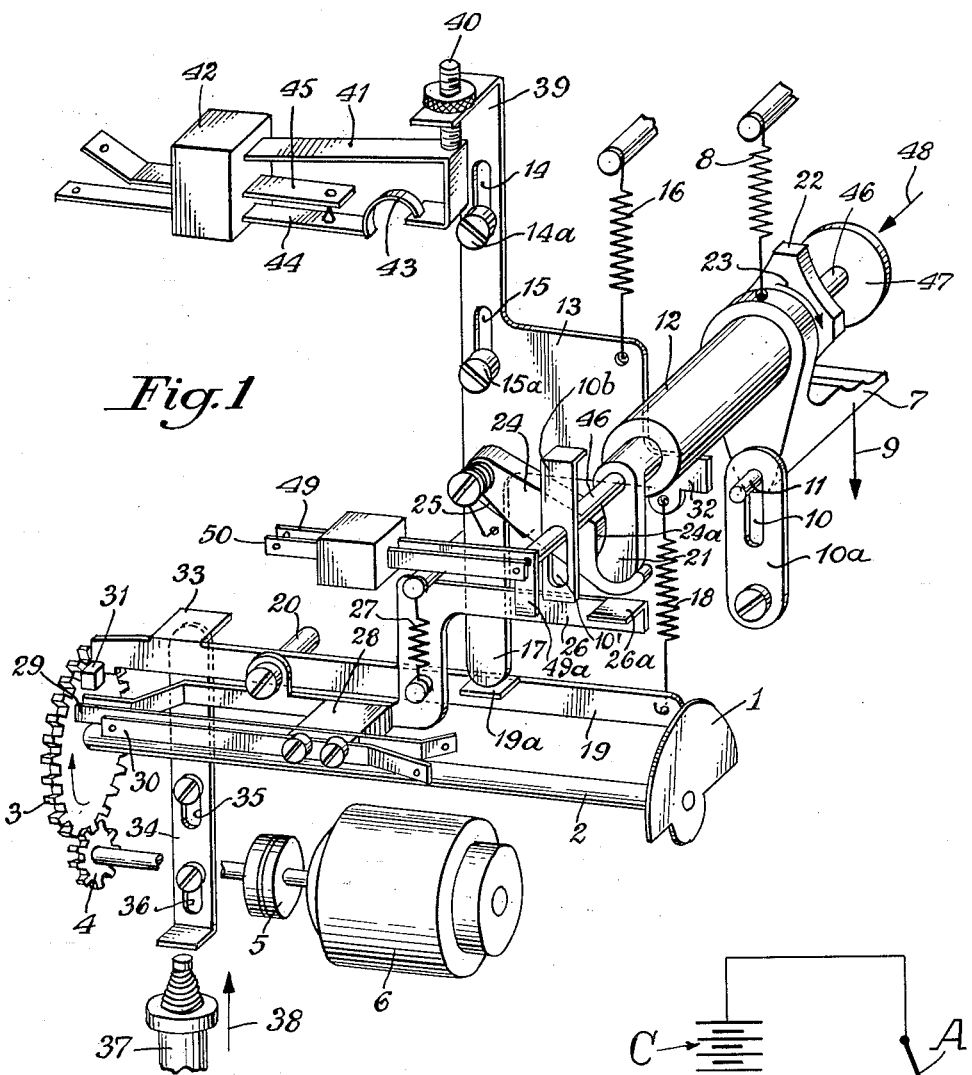
FIG. 1 illustrates in a perspective view the arrangement of the several parts in the camera.

According to FIG. 1, the shutter disc 1 is connected to a shaft 2 carrying a drive disc formed by a gear 3. The gear 3 meshes with a gear 4 driven by an electric motor 6 over a slip clutch 5. The release key 7 of the camera is displaceable against the action of a spring 8 suspended in the camera housing in the direction of the vertical arrow 9. The release key 7 is guided by a pin 11 in a slot 10 of a guide plate 10a and is attached to a hollow shaft 12. Therefore, the movement of the key 7 will also displace the hollow shaft 12 vertically downward and transversely to its axis in the direction of the vertical arrow 9. The hollow shaft 12 extends horizontally and during its transverse movement takes along a vertically arranged slidable plate 13 which has a horizontally extending nose 32 which is engaged by the hollow shaft 12. The slidable plate 13 is movably supported in vertical direction by guide slots 14 and 15 and pins 14a and 15a against the action of the vertically disposed tension spring 16 in the direction of the arrow 9. A downwardly projecting finger 17 of the slidable plate 13, due to the tension of a vertical spring 18 which is suspended from the plate 13, engages the projection 19a of a horizontal lever 19 which is rotatably supported by a horizontal pin 20 which is fixedly secured to the camera housing. A cam 21 which is integral with the hollow shaft 12 and extends downwardly therefrom can be rotated about 90° in the direction of an arrow 23 when an adjusting knob 22 on the shaft 12 is rotated so as to selectively change the camera from a single picture to motion pictures or vice versa. In the position of the adjusting knob 22 shown in FIG. 1 the camera is adjusted for taking single pictures. A lever arm 24 is swingably mounted on the sliding plate 13 and under the action of a torsion spring 25 this lever 24 is firmly pressed with its free end against the lower portion of the cam 21. Because of the shown adjustment of the camera for taking single pictures, a downward pressure of the release key 7 will actuate a control lever 26 which has a projection 26a which is engaged by the lever 24. The control lever 26 is pivotally supported by the pin 20 in the same manner as the lever 19, and is held in the shown initial position by a vertical tension spring 27. One end of the spring 27 is fastened to the camera housing. Two leaf spring contacts 29 and 30 are fastened by an insulating block 28 onto the lever 26. One end of the contact spring 29 reaches so far that an insulated portion of the same extends into the path of a projection 31 arranged on one face of the gear 3, while the other contact spring 30 terminates in front of the same. The ends of the springs 29 and 30 form a normally closed switch which can be opened by the projection 31.

The end of the control lever 26 adjacent to the gear 3 is angularly bent in such a manner that this end extends into the path of the projection cam 31. One end of the lever 19 also extends into the path of the projection 31 but is spaced a distance equal to the width of the projection 31 from the adjacent end of the lever 26. These ends of the levers 26 and 19 extend alternately into the path of the projection 31 in such a manner that in rest position, i.e. in case the release key 7 is not depressed, the lever 19 stops the projection 31, while the control lever 26 is released. But if the key 7 is depressed, and while the camera is adjusted for single picture, the control lever 26 acts to stop the projection 31. The lever 19 is provided with an additional stop 33 which can be actuated by a vertically slidable bar 34 which is movably supported in the camera housing by pin and slot connections 35 and 36 and can be moved by a cable release 37 in the direction of the arrow 38.

Figure 2:
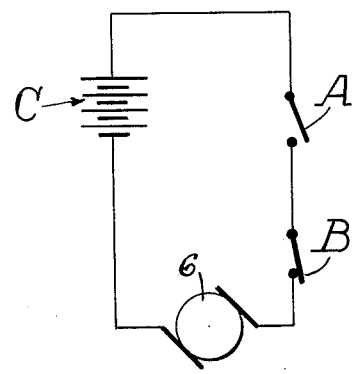
FIG. 2 illustrates the circuit arrangement of the two switches.
Figure 3:
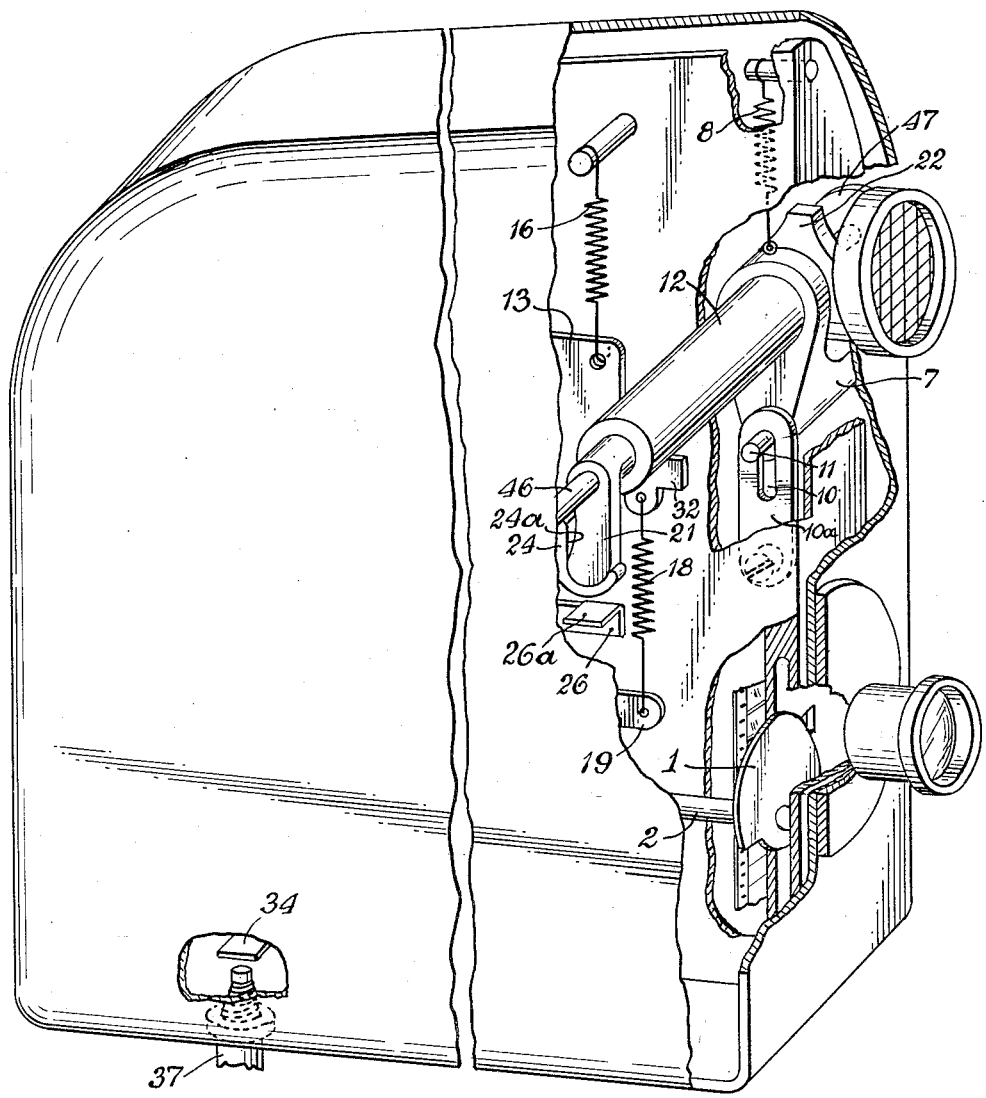
FIG. 3 shows a perspective view of the camera.

At the angularly bent upper end of the projection 39 of the slidable plate 13 is positioned an adjusting screw 40. A lever 41 of a snap-switch 42 engages yieldably said adjusting screw 40. A spring contact 44 is connected with the lever 41 by a curved leaf spring 43. During a pressure upon the key 7, which also causes a movement of the slidable plate 13, the spring contact 44 engages a leaf spring 45 so that the motor 6 is connected with the voltage source, as shown in the circuit diagram of FIG. 2. In this circuit diagram the switch 42 is designated with A. The switch B is formed by the two contact springs 29 and 30. While the switch A is designed as an operating contact and is normally opened, the switch B acts as a rest contact and is normally closed. Both switches are arranged in series with the voltage source C of the motor 6.

A control pin 46 extends axially slidable through the hollow shaft 12 and has a circular disc 47 at its end positioned outside of the camera. An axial displacement of the control pin 46 in the direction of the arrow 48 and against the action of a spring (not shown) causes the two leaf springs 49 and 50 with contacts thereon to come into engagement with each other. These contacts switch on a diaphragm mechanism which is not described in detail.

The operation of the arrangement for permitting the taking of individual pictures with the camera is as follows:

In the rest position of the camera the lever 19 stops the gear 3 and therewith any movement of the shutter disc 1 together with any additional devices which are in operative engagement with the gear 3. The control lever 26 and one end of the contact spring 29 are hereby out of the range of the gear 3. The switch 29, 30 (switch B in FIG. 2) is closed. The snap-switch 42–45 (switch A in FIG. 2) is open and the motor 6 is deenergized.

When the release key 7 is depressed, the slidable plate 13 which follows the downward movement of the key 7 will first close the snap-switch 42–45. The motor 6 will be energized and will develop a torsional moment and by overcoming the friction in the slip clutch 5 will start to rotate by itself. In the meantime, the elements 13, 17, 19a and 21, 24, 26a are operated to cause a movement of the lever 19 away from the projection 31 on the gear 3, while at the same time the lever 26 and the end of the contact spring 29 is moved into the path of the projection 31. These two operations are completed by a further movement of the release key 7 in such a manner that the ends of the lever 26 and of the leaf spring 29 were already pivoted behind the projection 31 before the end of the lever 19 is released in front of the same. The gear 3 is now released and will be rotated by the motor 6 over the slip clutch 5 and the gear 4. As a result the shutter disc 1 is rotated one step and will cause the exposure of one frame on the film. After nearly a complete revolution of the gear 3 the projection 31 engages the contact spring 29 and presses the same forwardly until it engages the end of the lever 26. This will cause a separation of the two contact springs 29, 30 and the motor 6 will become deenergized and will stop. The gear 3 is arrested by the lever 26 in a position in which the shutter disc 1 will cover the film or will discontinue the exposure of the film so that a single frame of the film has been exposed.

The release key 7 may remain depressed for any desired period of time without in any way impairing the current source.

Upon release of the key 7, the previously actuated elements return to their starting position under the action of the springs 8, 16, 18, 27 and 41. One end of the lever 19 enters into the path of the projection 31, while the respective end of the lever 26 and the end of the contact spring 29 are moved away from said path of the projection 31. As soon as this has taken place, the contact 29 is pressed into engagement with the contact 30 so that the motor 6 is again energized and starts rotating and thus rotates also the gear 3 until the projection 31 engages the adjacent end of the lever 19. The gear 3 as well as the shutter disc 1 are thus locked in their normal starting position. During the last portion of the return movement of the slidable plate 13 the snap switch 42–45 is opened, thus again deenergizing the motor 6.

For making picture exposures with the camera, the adjusting knob 22 is rotated approximately 90° in the direction of the arrow 23. This adjustment causes the cam 21 on the hollow shaft 12 to move the lever 24 into such a position that it comes outside the range of the lever 26. When the release key 7 is now depressed, the snap-switch 42–45 will be closed and the lever 19 will be moved away from the path of the projection 31 on the gear 3, as in the described adjustment of the camera for individual exposures, but the control lever 26 remains out of operation and the switch 29, 30 will remain closed. Therefore, the shutter disc 1 will continue to rotate until the release key 7 is no longer depressed, whereupon the lever 19 returns into the path of the projection 31 on the gear 3 and stops the latter. Upon a further release of the key 7, the snap-switch will be opened again and the motor 6 will be deenergized.

In case the camera is to be operated by a cable release 37, the control device will operate for making individual exposures and motion picture exposures in the same manner as described in the foregoing. The release key 7, which is not actuated in this case, remains stationary so that the parts 12 and 21 will not be moved in the direction of the arrow 9. In this case the spring 18 takes care of the necessary cooperation and movement of the slidable plate 13 with the lever 19 which is now controlled by the cable release 37. It should be noted that the spring 18 is stronger than the spring 16 which latter holds the slidable plate 13 in its starting position. When the knob 22 is rotated to adjust the camera for making individual exposures by operating the cable release, the lever 24 which is carried by the downwardly moving slidable plate 13 will slide with its end face 24a along the now stationary cam 21 and retains its operative position with respect to the control lever 26.

An adjustment of the screw 42 permits an adjustment of the operation (closing and opening, respectively) of the snap-switch 42–45 and therewith the starting time of the motor 6 relatively to the operation of the control members 19, 26, 29 which are actuated by the release key 7 or by the cable release 37.

When depressing the release key 7 the hollow shaft 12 is moved to a position parallel to that shown, in direction of the arrow 9. The release key 7 is guided by a pin 11 in a slot 10 of a guide plate 10a and besides a slot 10' of a guide plate 10b. This causes the displacement of the control pin 46. So that this pin cannot leave the range of the spring 49 the latter is provided with the extension 49a.

What we claim is:

1. In a camera for producing motion pictures and individual pictures, a manually operable shutter release key, a rotatably mounted shutter disc, a mechanical control device therefor, means for rotating said shutter disc including an electric motor and a slip clutch between said electric motor and said shuter disc, a circuit for said motor including a normally open switch and a normally closed switch, a releasable arresting means for the shutter disc, means operatively connecting said shutter release key to said normally open switch control means for said mechanical control device operative by said manually operable key to first close said normally open switch and energize said electric motor and then operate said control device to release said shutter disc, and a second arresting means for said shutter disc associated with said normally closed switch to interrupt the motor circuit after said shutter disc has been rotated a single revolution.

2. In a camera for producing motion pictures and individual pictures, a manually operable shutter release key, a rotatably mounted shutter disc, a mechanical control device therefor, means for rotating said shutter disc including an electric motor and a slip clutch between said electric motor and said shutter disc, a circuit for said motor including a normally open switch and a normally closed switch, a releasable arresting means for said shutter disc, means operatively connecting said shutter release key to said normally open switch, control means for said mechanical control device operative by said manually operable key to first close said normally open switch and energize said electric motor and then operate said control device to release said shutter disc, and a second arresting means for said shutter disc associated with said normally closed switch to interrupt the motor circuit after said shutter disc has been rotated through a single revolution, said control means being effective upon the return of the release key to its starting position so that first said releasable arresting means for said shutter disc is engaged and then said electric motor is deenergized.

3. In a camera for producing motion pictures and individual pictures, a manually operable shutter release key, a rotatably mounted shutter disc, a mechanical control device therefor, means for rotating said shutter disc including an electric motor drivingly connected to said shutter disc, a slip clutch in the connection between said electric motor and said shutter disc, a releasable arresting means for said shutter disc, and control means for said electric motor operative in such a dependence from said manually operable key that upon actuation of the latter first said electric motor is energized and then said shutter disc is operatively connected with said electric motor to be driven thereby, said control means for said electric motor including a circuit with a source of electrical energy having a normally closed switch and a normally open snap-switch said normally open switch being closed when said manually operable shutter release key is manually depressed and said normally closed switch being selectively operable by said mechanical control device to interrupt said circuit and permit said circuit and switch to remain closed 4. In a camera according to claim 1, in which said releasable arresting means controls the shutter disc for making individual exposures, and including a second arresting means operatively connectable with said first arresting means, said second arresting means being operable alternately with said first arresting means to arrest rotation of said shutter disc after one revolution thereby and after release by said first arresting means, so that upon actuation of said release key when a single exposure is to be made the rotation of the shutter disc upon release of said first arresting means will be stopped after the effected single exposure, while upon return of said release key said snap switch is opened and the electric motor is deenergized.

5. In a camera according to claim 1, in which said releasable arresting means controls said shutter disc for making individual exposures, and including a second arresting means operatively connectable with said first arresting means, said second arresting means being operable alternately with said first arresting means to arrest said shutter disc after one revolution of said disc and after the same has been released by said first arresting means, so that upon actuation of said release key when a single exposure is to be made the rotation of said shutter disc upon release of said first arresting means will be stopped after the effected single exposure, while upon return of said release key said second switch will be opened and said electric motor is deenergized, and said normally closed switch for said electric motor will be closed to deenergize the motor and after said shutter disc has been stopped by said second arresting means while upon return of said release key said normally closed switch will again close momentarily and energize the motor for engagement of said shutter disc with said first arresting means.

6. In a camera for producing motion pictures and individual pictures, a manually operable shutter release key, a shutter disc rotatably mounted on the camera, a mechanical control device associated with said shutter disc, an electric motor drivingly connected to said shutter disc, a first releasable arresting means for the shutter disc, control means operable in response to depression of the release key to first energize the electric motor and then release the shutter disc and its associated mechanical control device, a second arresting means associated with said first arresting means for said shutter disc for the production of individual pictures, said second arresting means operating alternately with the first arresting means such that the second arresting means stops the shutter disc after one revolution thereof and after the same has completed an exposure and the shutter disc has been released by the first arresting means upon depression of the release key, said second arresting means upon the return movement of the release key being disengaged so that the shutter disc will be arrested by the first arresting means and the shutter will be positioned in its stop position and the motor is de-energized.

7. A camera according to claim 6 characterized by means permitting adjustment of the path of movement of the release key between the energizing of the electric motor and the release of the arresting means for the shutter disc.

8. A camera with an electric motor and means for producing individual exposures according to claim 6 including two switches connected in series in the circuit of said electric motor, one of said switches being arranged as an operational contact for closing and opening the motor circuit, while the other switch provides a rest contact which interrupts the circuit momentarily after each individual exposure has been made so that a temporary closing of the motor circuit will occur upon release of the key and until the first named switch is opened.

9. In a camera for producing motion pictures and individual pictures, a manually operable shutter release key, a rotatable mounted shutter disc, a mechanical control device associated with said disc, an electric motor drivingly connected to said disc, a slip clutch between said electric motor and shutter disc, a releasable arresting means for the shutter disc, control means for said mechanical control device operative by said manually operable key such that upon actuation of the latter said motor will be operated and then said control device will release said shutter disc to permit the motor to be operatively connected with said disc, two switches connected in series in a circuit including said electric motor, one of said switches providing an operational contact for opening and closing said circuit, while the other switch provides a rest contact which interrupts the circuit of the motor momentarily after each individual exposure, said switch operating as a rest contact being arranged in a release and locking linkage in such a manner that said switch will first open after said single exposure is made but will close again before the first named switch interrupts the motor circuit.

10. In a camera for producing motion pictures and individual pictures, a manually operable shutter release key, a shutter disc rotatably mounted in said camera, a mechanical control device therefor, an electric motor for rotating said shutter disc, a circuit for said motor including first and second switches, a slip clutch in the connection between said motor and disc, gearing between said slip clutch and shutter disc, a projection on one face of a gear of said gearing, a control lever adapted to engage said projection to arrest rotation of said shutter disc, said control lever being adapted to be moved out of the path of said projection to permit rotation of said shutter and to be moved into engagement with said projection upon release of said shutter release key, a second control lever associated with the first control lever adapted to engage said projection after its release by said first control lever, a switch forming a rest contact associated with said second control lever and being included in said circuit as said second switch, said rest contact and second switch being opened by engagement of said projection carried by said gear and being closed again as soon as said second control lever is removed from the path of said projection whereby said electric motor is again energized to move said projection into engagement with said first control lever after which said motor is de-energized upon complete release of said manually operable release key and said first named switch has been opened by the final movement of said key to its rest position.

References Cited in the file of this patent

UNITED STATES PATENTS

| | | |
|---|---|---|
| 2,323,576 | Sperry | July 6, 1943 |
| 2,667,808 | Hart | Feb. 2, 1954 |
| 2,943,532 | Hashimoto | July 5, 1960 |